United States Patent Office 3,240,538
Patented Mar. 15, 1966

3,240,538
TRAILER BRAKE FLUID SYSTEM INCLUDING A
MECHANICAL LOCK
Harry M. Valentine, Elyria, Ohio, assignor to Bendix-
Westinghouse Automotive Air Brake Company, Elyria,
Ohio, a corporation of Delaware
Filed Feb. 14, 1964, Ser. No. 344,903
8 Claims. (Cl. 303—29)

This invention relates to fluid pressure braking systems and more particularly to parking means for locking brakes in applied position, especially on trailer vehicles.

Spring applied, fluid pressure released locking means for locking fluid pressure controlled brakes in applied position for parking or emergency purposes are being widely accepted not only for use on tractors of tractor-trailer combinations but also on trailers. As those skilled in the art recognize, trailer fluid pressure braking systems usually include a charged emergency conduit or line and when this is vented to atmosphere, either deliberately or by rupture, full pressure existing in the emergency reservoir carried on the trailer is automatically delivered through the trailer relay-emergency valve to the trailer brake actuators, thus moving the actuators to applied position with a pressure which may range up to 110 p.s.i., a braking pressure far in excess of that normally utilized in applying the trailer brakes. Where the trailer brakes employ mechanical locking means, it is desirable, for reasons that will become apparent, that the locking means not move to locking position when full reservoir pressure is applied to the trailer actuators.

In view of the foregoing, it is an object of the present invention to provide means for retaining the brake locking means out of their locking position during an emergency application of the trailer brakes so long as the pressure in the actuators is above a pre-determined level.

Another object of the invention is to provide means for automatically venting the trailer system after an emergency application of the trainer brakes until the pressure in the system has fallen below a pre-determined level whereupon the brake locking means automatically move to locking position to retain the trailer brakes applied but only after the braking force has been partially relieved to a moderate level by the automatic venting means.

Figure 1:
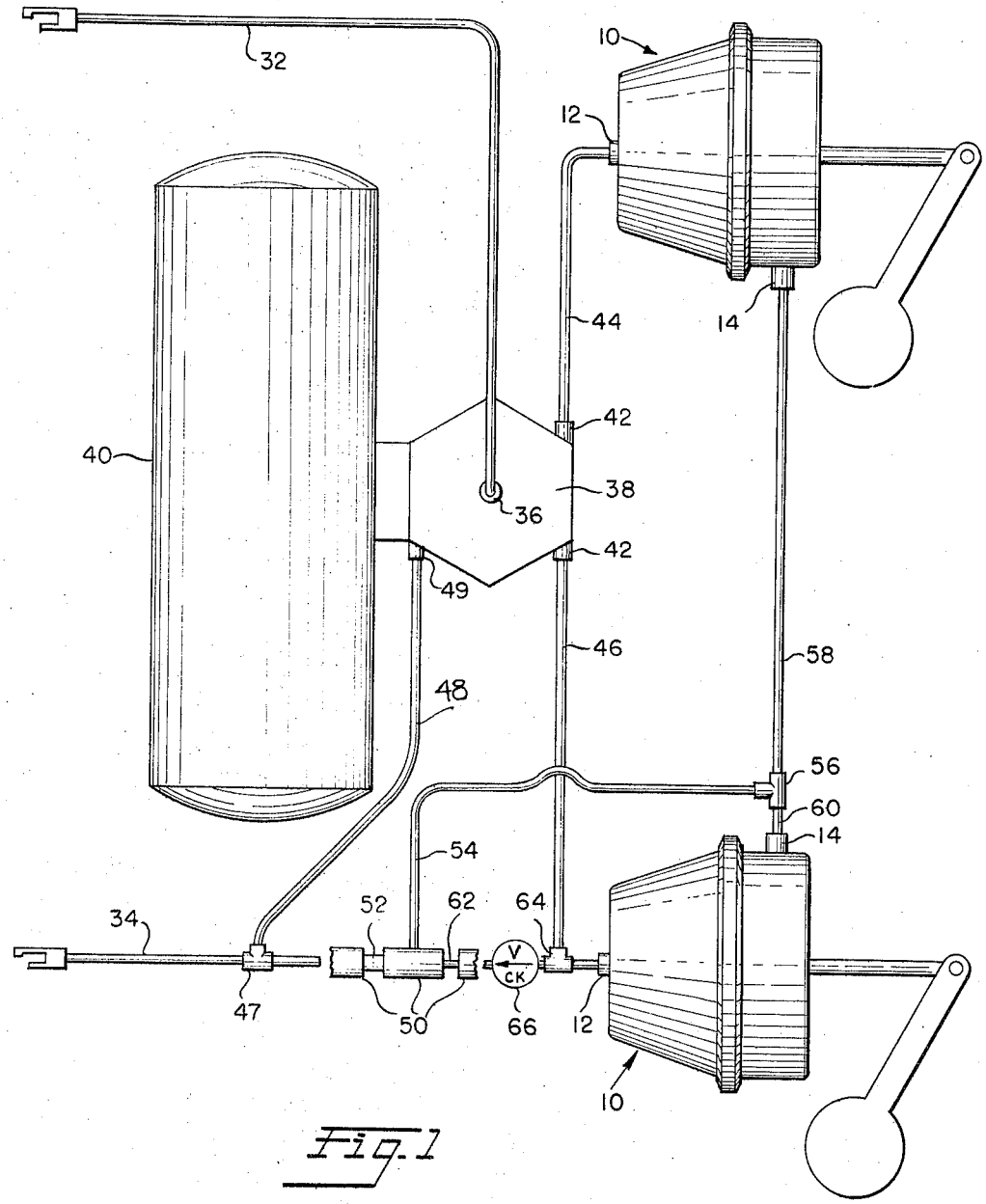
Figure 2:
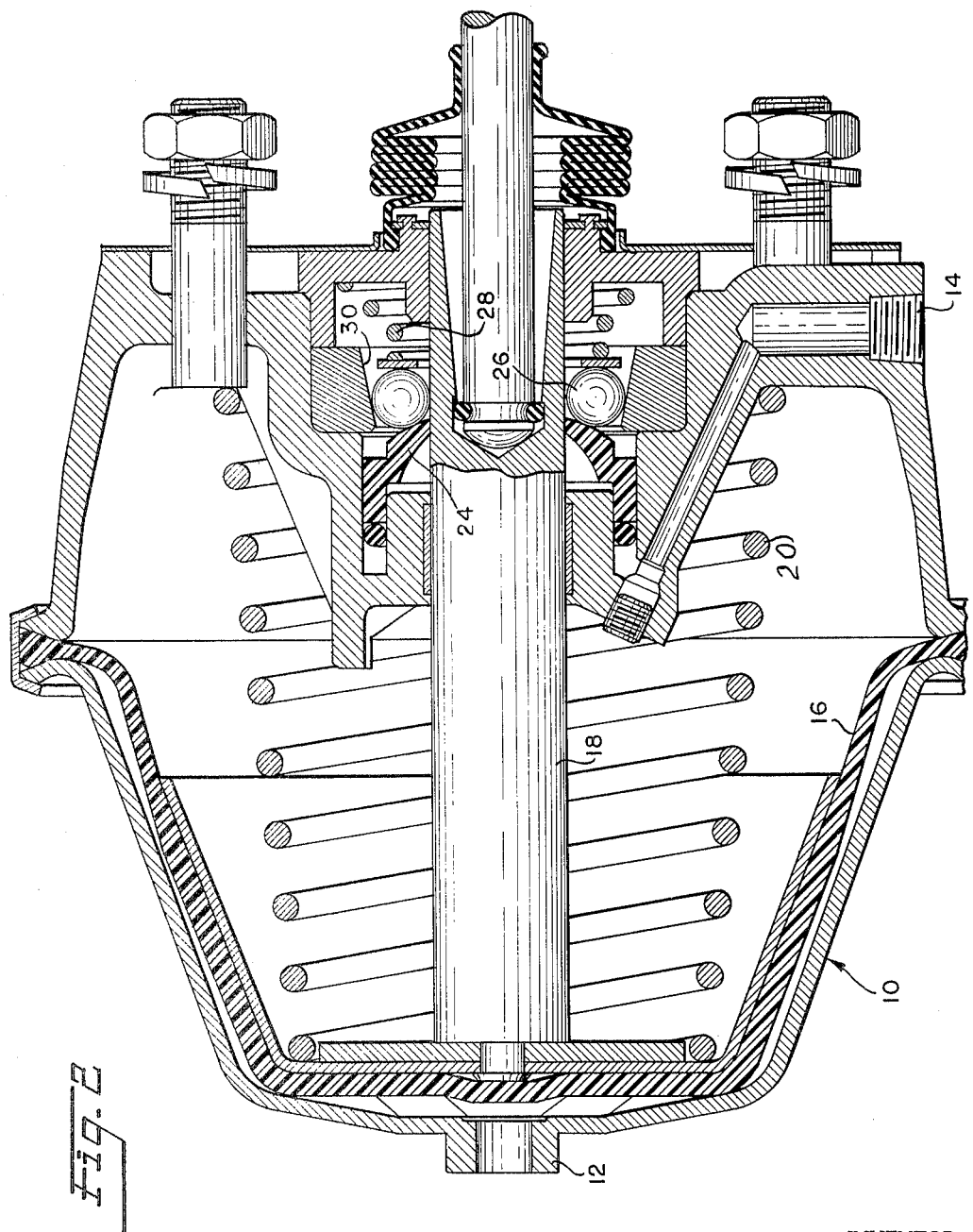

Other objects and their attendant advantages will become apparent as the following detailed description is read in conjunction with the accompanying drawings wherein:

FIG. 1 is a schematic depiction of a fluid pressure operated trailer braking system employing the features of the invention; and FIG. 2 is an enlarged vertical cross sectional view of a typical actuator employing a fluid pressure released, spring applied locking means for locking the brakes in applied position.

In order to render the present invention meaningful, a brief preliminary description of a brake actuator and lock therefor is appropriate. (For a detailed description of the lock mechanism see the prior application of Frank R. Schubert, Serial No. 263,330, filed March 6, 1963, and assigned to the same assignee as the present invention.) With reference now to FIG. 2, the actuator itself is of generally conventional construction and comprises a body 10 having a service port 12 and a lock port 14. Fluid pressure is delivered to the service port to operate on a diaphragm 16 to move a brake applying rod 18 to the right in FIG. 2 against the force of a spring 20 to apply the brakes. When pressure is relieved from the service port 12 the parts of the actuator return to the position of FIG. 2 to release the brakes.

During normal operation fluid pressure above a pre-determined level, say 60 p.s.i., is at all times delivered to the lock port 14 to retain the locking means in its release position. Briefly, the unlocking pressure acts on the rear side of an annular piston member 24 to cause this to move to the right in FIG. 2 and displace a series of locking rollers 26 to the right against the pressure of a spring 28 so that the rollers normally reside in the enlarged end of a rearwardly tapering annular passage 30. It will be apparent that when the brake rod 18 is in applied position and pressure is relieved from the lock port 14 so that the rollers 26 are moved by the spring 28 towards the rear of the tapered opening 30, when pressure is subsequently relieved from the service port the tendency of the rod 18 to move to the left causes the rollers to be tightly jammed into the tapered passage 30 and against the exterior of the rod 18 so that the latter is unable to return to the position of FIG. 2 and the brakes are thus effectively locked in applied position.

After the brakes have been locked as above described, release of the locking means is effected by first admitting fluid pressure above the pre-determined level to the lock port 14 and thereafter admitting service pressure to the service port to move the actuator rod 18 slightly in a brake applying direction sufficient to break free the locking balls so that they are immediately moved, by pressure, fully to the right out of locking position whereupon release of service pressure permits the parts of the actuator to move to the position of FIG. 2 in readiness for normal brake operation.

It should be apparent from the foregoing description that where extremely high fluid pressure is delivered to the service port 12 and the locking pressure is relieved from the port 14, it is conceivable that the actuator rod 18 would be moved so far to the right in FIG. 2 that it might be difficult to move the actuator rod slightly further to the right by a subsequent service application to break the lock rollers free. This problem is substantially non-existent where the locks are employed on a vehicle whose service braking is under the direct control of a pedal operated brake valve. Where locks, however, are employed in conjunction with actuators which are controlled by relay emergency valves, as on trailers, sudden venting of the emergency line may cause the actuators to be moved by full reservoir pressure to applied position with such force that should the lock port at this juncture be vented and the lock thus applied, it might be difficult, upon restoration of pressure in the emergency line, to break the lock free in response to a subsequent application of service pressure to the actuator.

The present invention eliminates the foregoing problem by providing means which, after an emergency application, vents the entire trailer braking system at a controlled rate while simultaneously retaining the locking means in a non-locking position until the pressure has reached a pre-determined level whereupon the locking means are automatically applied, but only after the pressure in the system and hence the braking force on the actuators has fallen to a moderate level.

Referring now to FIG. 1 a trailer braking system is disclosed comprising conventional service and emergency lines 32, 34. The service line 32 leads to the usual control port 36 of a conventional relay emergency valve 38 which is connected to an emergency reservoir 40 and has a pair of outlet ports 42 which are connected by way of conduits 44, 46 to the service ports 12 in the actuator bodies 10. The emergency line 34 is connected by way of a T 47 and a conduit 48 to the usual emergency port 49 of the relay emergency valve. Those skilled in the art recognize that the emergency reservoir 40 receives fluid pressure from the emergency line 34 and conduit 48 with the pressure in the emergency line retaining an emergency valve part in the valve 38 in inactive position until such time as emergency pressure is vented from the emergency line. When this occurs the emergency valve part is automatically moved to a position wherein the full pressure existing in reservoir 40 is delivered to the service ports 12 of the actuators to apply the trailer brakes.

As so far described, the trailer braking system is in all respects conventional. However, where the trailer brake actuators are provided with the mechanical lock means previously described, under normal operating conditions the lock must be retained by pressure in their unlocking or release position and the pressure for effecting this is, in accordance with the invention, derived directly from the emergency line by way of a conduit 50 which is connected at one end to the T 47 and leads through a choke 52, whose purpose will be explained, to a branch conduit 54 connected by a T 56 to conduits 58, 60 leading to the lock ports 14 of the actuators. Assuming that the locks are retained in non-locking position by pressure above 60 p.s.i., so long as this minimum pressure exists in the emergency line 34 the locks are released and the actuators are operable in the normal manner to apply and release the brakes and under these conditions the choke 52 performs no particular function.

Beyond the connection of branch conduit 54 with conduit 50 there is a second choke 62 which is substantially smaller than the aforementioned choke 52 and in the conduit 50 between the smaller choke 62 and a T 64, which connects the conduit 50 with the aforementioned conduit 46 leading to the service port 12 of one of the actuators 10, is a one-way check valve 66 which permits fluid to flow from the conduit 46 through the conduit 50 to the emergency line 34 when the pressure in the latter is less than the pressure in conduit 46 but prevents the flow of fluid in the reverse direction.

During normal brake operation, the pressure in the conduits 44, 46 leading to the service ports of the actuators will never exceed and will usually be substantially less than the emergency pressure in the line 34. However, in accordance with the invention, should the emergency line 34 be deliberately or accidentally vented, the pressure in the emergency line will be immediately reduced to atmospheric level and full reservoir 40 pressure will be delivered to the service ports 12 to effect an emergency application of the trailer brakes. When the emergency line is thus vented to atmosphere, the pressure at the lock ports 14 would tend to fall from full reservoir pressure toward atmospheric pressure but this action is delayed by the large choke 52 up-stream of the connection of the branch conduit 54 with the conduit 50. Also, at this juncture, after the trailer brakes have been applied with full reservoir pressure, the fluid in the actuators and in the emergency reservoir 40 commences to bleed down through the check valve 66, the smaller choke 62 and the large choke 52 to the now-open emergency line 34. However, the immediate bleed-down of the reservoir and actuators are also retarded by the small choke 62 which in conjunction with the large choke 52 causes a control of pressure in the conduit 50 between the chokes which feeds back through the conduit 54 intermediate the chokes to act on the lock pistons to obtain these temporarily in their unlocking position.

The lock rollers engage the brake rods 18 when the pressure at the lock ports 14 recedes to, say, 45 p.s.i. It may be desirable, however, to have the locks engage when the brake actuator pressure at port 12 recedes to, say, 60, 55, 50 p.s.i. or any pressure above the lock engaging pressure of said 45 p.s.i. By the selection of the sizes of the chokes 62, 52 the rate of decay of the pressure at actuator port 12 relative to that at lock port 14 can be controlled to establish the magnitude of the actuator application to be locked on. For example, assume that choke 62 and 52 are omitted; under this condition the actuator application and lock engaging pressures would be of equal magnitude of said 45 p.s.i.; however, if a choke 62 is introduced the locks will engage at a higher actuator pressure application. The introduction of the choke 52 is for the purpose of more accurate control of the desired actuator application pressure. After the actuator application is locked on the entire system continues to bleed down through the check valve 66, chokes 62, 52 and the emergency line to atmospheric level, thus indicating to the operator that the vehicle is parked on the mechanical locks.

Because only moderate braking force was operating on the actuators at the moment they were locked in applied position it will be apparent that when pressure above 60 p.s.i. has been restored in the emergency line and reservoir and hence at the lock ports, a normal service application can be utilized to effect freeing of the locking balls as previously described.

From the foregoing description it will be apparent that the present invention provides simple yet reliable time delay means for retaining pressure at the lock ports of sufficient magnitude to retain the locks in their unlocking position until such time as the emergency force operating on the actuators has controllably fallen to a moderate level, whereby the locks may subsequently be readily unlocked when normal conditions have been restored. Where the foregoing description or the claims refer to a "trailer braking system" this is intended to include any braking system which employs both locks and a relay-emergency valve for controlling certain of the brakes. It will be of course understood that the invention is susceptible to a variety of changes and modifications without departing from the spirit and scope of the appended claims.

What is claimed is:

1. In combination with a fluid pressure braking system which includes a brake actuator, a fluid pressure released, spring applied brake locking means for locking the actuator in applied position, service and lock ports in said actuator, an emergency reservoir, a relay-emergency valve connected to said reservoir and having control, emergency and outlet ports, emergency and service lines connected respectively to said emergency and control ports, and fluid conduit means interconnecting said outlet port and the service port of said actuator, the invention which comprises a conduit interconnecting said emergency line and the fluid conduit means leading to the service port of said actuator, a one way check valve in said conduit arranged to permit fluid flow from said actuator to said emergency line but not in the reverse direction, first and second chokes serially arranged in said last named conduit between said check valve and said emergency line, and branch conduit means having one end connected to said last named conduit between said chokes and the other end connected to the lock port of said actuator.

2. The combination of claim 1 wherein said first choke is of less size than the second choke.

3. In combination with a fluid pressure braking system which includes a brake actuator, a fluid pressure released, spring applied brake locking means for locking the actuator in applied position, service and lock ports in said actuator, an emergency reservoir, a relay-emergency valve connected to said reservoir and having control, emergency and outlet ports, emergency and service lines connected respectively to said emergency and control ports, and fluid conduit means interconnecting said outlet port and the service port of said actuator, the invention which comprises conduit means connecting said service port with said emergency line, a one-way check valve in said conduit means for preventing the passage of fluid from said emergency line to said service port while permitting flow in the reverse direction, second conduit means having one end connected to said first conduit means between said emergency line and said check valve and the other end connected to said lock port, and flow retarding means in said first conduit means between the emergency line and the connected end of said second conduit whereby the pressure of fluid flowing from said service port through said first conduit means to said emergency line upon venting thereof is simultaneously fed back to said lock port.

4. The combination of claim 3 including a second flow retarding means of less capacity than the first flow retarding means and disposed in said first conduit means between said check valve and the connected end of said second conduit means.

5. In a braking system including an actuator having a spring applied, fluid pressure released brake locking means and service and lock ports, a relay emergency valve, an emergency reservoir and an emergency line for controlling operation of said relay emergency valve to deliver pressure from said reservoir directly to said service port upon venting of said emergency line, the invention which comprises a conduit interconnecting said service port and said emergency line, a one way check valve in said conduit for preventing the flow of fluid from said emergency line to said service port, a second conduit having one end connected to said first conduit between said check valve and said emergency line and the other end connected to the lock port of said actuator, and flow retarding means in said first conduit between the connected end of said second conduit and said emergency line, said flow retarding means effecting feed back to said lock port of pressure delivered from said service port to said first conduit upon venting of said emergency line to retain said brake locks in released position until the pressure in said emergency reservoir has bled down to a pre-determined level.

6. In a braking system including an actuator having a spring applied, fluid pressure released brake locking means and service and lock ports, a relay emergency valve, an emergency reservoir and an emergency line for controlling operation of said relay emergency valve to deliver pressure from said reservoir directly to said service port upon venting of said emergency line, the invention which comprises means including a conduit and a flow retarder for connecting said actuator and said emergency reservoir to atmosphere upon venting of said emergency line, and means for feeding back to said lock port the fluid pressure existing in said conduit between said actuator and said flow retarder whereby the pressure at said lock port falls proportionately with the pressure in said reservoir and in said actuator.

7. In the braking system of claim 6 wherein said flow retarder comprises first and second serially arranged chokes in said conduit, one of said chokes having less capacity than the other and wherein the feed back means comprises a second conduit connected at one end to said lock port and at the other end to said first conduit intermediate the chokes.

8. In the system of claim 6 wherein said conduit is connected directly to said emergency line and a one-way check valve in said conduit intermediate said service port and said flow retarder to prevent the flow of fluid from said emergency line to said service port while permitting flow in the reverse direction.

No references cited.

EUGENE G. BOTZ, *Primary Examiner.*